United States Patent
Graf et al.

(10) Patent No.: US 8,589,010 B2
(45) Date of Patent: Nov. 19, 2013

(54) METHOD FOR OPERATING DRIVE CONTROL UNITS IN A MOTOR VEHICLE, AND MOTOR VEHICLE

(75) Inventors: Johann Graf, Hausen (DE); Martin Steinbrueck, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/641,768

(22) PCT Filed: Mar. 29, 2011

(86) PCT No.: PCT/EP2011/001561
§ 371 (c)(1),
(2), (4) Date: Jan. 2, 2013

(87) PCT Pub. No.: WO2011/128025
PCT Pub. Date: Oct. 20, 2011

(65) Prior Publication Data
US 2013/0103237 A1    Apr. 25, 2013

(30) Foreign Application Priority Data
Apr. 17, 2010   (DE) .......................... 10 2010 015 314

(51) Int. Cl.
*B60R 25/04*     (2013.01)
*B60W 10/06*     (2006.01)

(52) U.S. Cl.
USPC ............................................. 701/22; 701/48

(58) Field of Classification Search
USPC ..................................................... 701/22, 48
See application file for complete search history.

(56) References Cited

U.S. PATENT DOCUMENTS

| | | | | |
|---|---|---|---|---|
| 5,481,456 | A * | 1/1996 | Ogura | 701/1 |
| 6,793,059 | B2 * | 9/2004 | Okada et al. | 192/84.1 |
| 6,919,791 | B2 * | 7/2005 | Toyomasu et al. | 340/5.31 |
| 6,962,224 | B2 * | 11/2005 | Nakanowatari | 180/65.225 |
| 7,617,027 | B2 * | 11/2009 | Jeong | 701/22 |
| 7,789,796 | B2 * | 9/2010 | Choi | 477/107 |

(Continued)

FOREIGN PATENT DOCUMENTS

| | | |
|---|---|---|
| DE | 199 54 757 | 5/2001 |
| DE | 103 38 649 | 3/2005 |

(Continued)

OTHER PUBLICATIONS

EPO Machine Translation of EP 1510422 (original EP document published Mar. 2, 2005).*

(Continued)

*Primary Examiner* — James Trammell
*Assistant Examiner* — David Testardi
(74) *Attorney, Agent, or Firm* — Staas & Halsey LLP

(57) ABSTRACT

In a motor vehicle having two different drives, in particular an internal combustion engine and an electric drive, there are two control units for the respective drives and a leading control unit (Hybrid), which preferably controls the internal combustion engine and assigns torque to the individual drives when there are torque requests. Corresponding request signals are sent and implemented only if the existence of a certain situation (key inserted, "terminal 15") is detected by an engine immobilizer control unit (EI master). In order for not too much time to pass due to the querying of the engine immobilizer control unit, the leading control unit informs the other control units that a query is sent so that the other control units can also send a query already.

15 Claims, 1 Drawing Sheet

(56) References Cited

U.S. PATENT DOCUMENTS

| | | | |
|---|---|---|---|
| 8,150,573 B2 * | 4/2012 | Shimizu et al. | 701/22 |
| 8,299,748 B2 * | 10/2012 | Soma et al. | 320/104 |
| 2010/0235026 A1 * | 9/2010 | Shimizu et al. | 701/22 |
| 2013/0096755 A1 * | 4/2013 | Graf et al. | 701/22 |

FOREIGN PATENT DOCUMENTS

| | | | | |
|---|---|---|---|---|
| DE | 103 46 673 | | 5/2005 | |
| DE | 10 2004 016 446 | | 10/2005 | |
| DE | 10 2006 049 641 | | 10/2008 | |
| DE | 102008032094 A1 * | | 1/2010 | B60R 16/023 |
| DE | 10 2010 015 314.1 | | 4/2010 | |
| EP | 1 512 591 | | 3/2005 | |
| EP | 1510422 B1 * | | 6/2006 | B60R 25/04 |
| EP | 2 058 197 | | 5/2009 | |
| JP | 2006256481 A * | | 9/2006 | |
| JP | 2007239589 A * | | 9/2007 | |
| JP | 2007246070 A * | | 9/2007 | |
| JP | 2010001016 A * | | 1/2010 | |
| WO | PCT/EP2011/001561 | | 3/2011 | |

OTHER PUBLICATIONS

JPO Machine Translation of JP 2006-256481 (original JP document published Sep. 2006).*
JPO Machine Translation of JP 2007-239589 (original JP document published Sep. 20, 2007).*
PCT/IB/326, PCT/IB/373, PCT/ISA/237 and PCT/IB/338, (date Nov. 7, 2012).
International Search Report for PCT/EP2011/001561, mailed on Jul. 27, 2011.

* cited by examiner

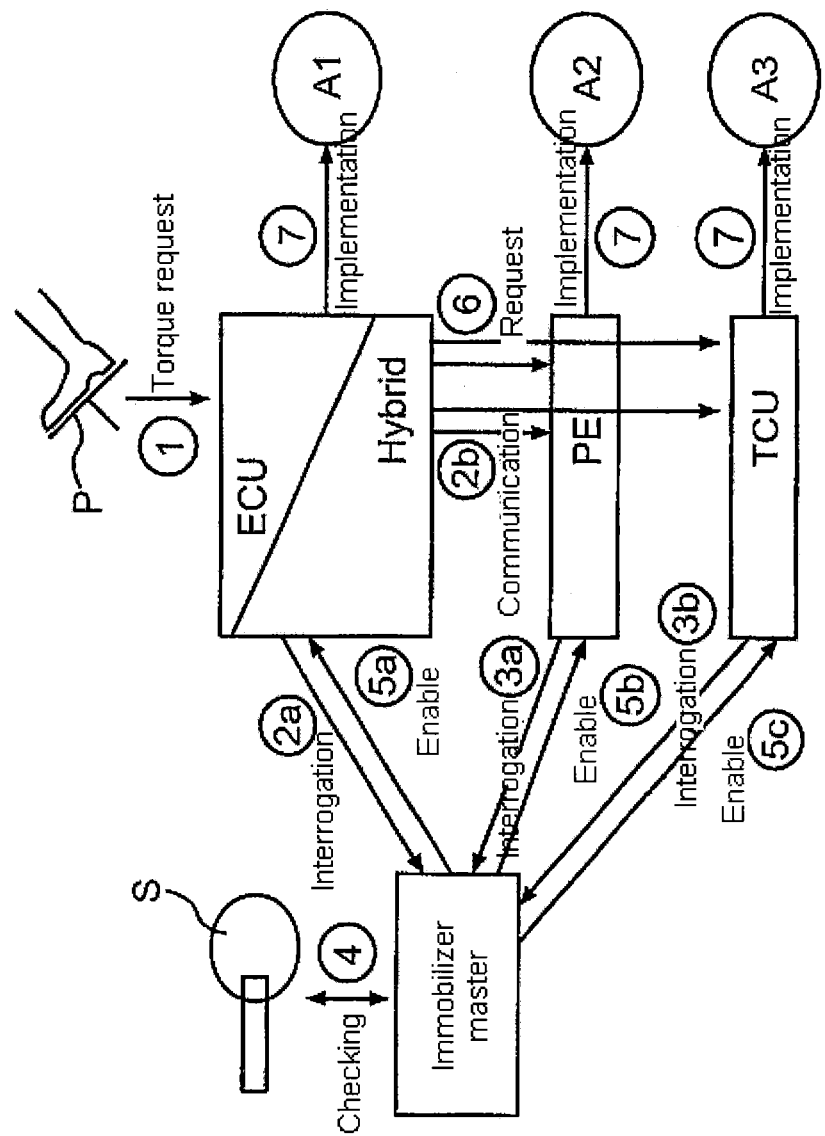

METHOD FOR OPERATING DRIVE CONTROL UNITS IN A MOTOR VEHICLE, AND MOTOR VEHICLE

CROSS REFERENCE TO RELATED APPLICATIONS

This application is based on and hereby claims priority to International Application No. PCT/EP2011/001561 filed on Mar. 29, 2011 and German Application No. 10 2010 015 314.1 filed on Apr. 17, 2010, the contents of which are hereby incorporated by reference.

BACKGROUND

The invention relates to a method for operating drive control units in a motor vehicle and to a motor vehicle.

Drive control units actuate different drives of the motor vehicle by outputting respective control signals. With respect to the motor vehicle it is to be assumed that there is an internal combustion engine as a first drive, with an associated first drive control unit for transmitting control signals to the internal combustion engine, and that there is an electric drive as the second drive, having an associated second drive control unit for transmitting control signals to the electric drive. A control unit is configured as a master control unit and receives presettings relating to a torque which is to be applied jointly by the drives, wherein it is the object of the control unit to implement these presettings by virtue of torque being assigned to the individual drives and corresponding request signals being transmitted to at least one of these drive control units.

In a motor vehicle there is typically also an immobilizer control unit whose task is to check whether a predetermined condition is met, before the motor vehicle can drive away. The predetermined condition includes, for example, the fact that a motor vehicle key is inserted and turned or a specific electronic identifier is read out. So that the individual control units cannot output control signals without the predetermined condition being satisfied, the immobilizer control unit transmits an enable signal to the control devices, typically in response to an interrogation. The intention here is to provide that at least the master control unit and at least one predetermined drive control unit, other than the master control unit, outputs only control signals if the immobilizer control unit has transmitted an enable signal to them after a respective interrogation by them.

Since, of course, the master control unit receives the presettings relating to a torque which is to be applied jointly by the drives, the master control unit is typically the first control unit which transmits an interrogation to the immobilizer control unit. If the master control unit receives the enable, this does not yet mean that the at least one predetermined further drive control unit receives an enable signal to the same extent. It is therefore the case that the master control unit firstly transmits the interrogation, then receives the enable signal and then outputs request signals to the at least one predetermined drive control unit. The latter cannot implement these request signals then but must instead firstly itself transmit an interrogation to the immobilizer control unit, and have received an interrogation signal in response thereto before the implementation can begin. This is disadvantageous because overall too much time passes until the torque request of a vehicle driver is implemented. The same applies if a torque request is output by a control unit, for example an adaptive cruise control system for controlling the distance of the vehicle from a vehicle traveling ahead when the vehicle is being automatically controlled.

SUMMARY

One potential object is to ensure possible rapid implementation of a torque request in a motor vehicle which has a plurality of drives, in particular both an internal combustion engine and an electric machine.

According to the inventors' proposals when an interrogation is output to the immobilizer control unit, the master control unit communicates the outputting process to the at least one predetermined drive control unit by a signal, so that the drive control unit is made also to transmit an interrogation to the immobilizer control unit. This saves the time which would otherwise elapse for the outputting of the interrogation, the checking of the situation by the immobilizer control unit, the transmitting back of the enable signal and finally the outputting of the request signal to the predetermined drive control unit. Instead, the predetermined drive control unit reacts as quickly as it receives the communicating signal, and also transmits an interrogation. This means that after reception of the enable signal by the master control unit, the at least one predetermined drive control unit has, as it were, immediately already also received such an enable signal, with the result that the request signal can be implemented directly or virtually directly. This means that the torque request is implemented more quickly than was the case in previous concepts.

The master control unit itself is preferably a drive control unit, in particular for an internal combustion engine, and the predetermined drive control unit which receives the communication is then another drive control unit, in particular one for an electric machine. It has been proven that the functionality of the master control can be integrated particularly easily into a drive control unit.

A transmission control unit for outputting control signals to a transmission can also be made available in the motor vehicle, and the master control unit can also communicate the outputting of an interrogation to this transmission control unit so that this transmission control unit also transmits at an early time an interrogation to the immobilizer control unit.

The motor vehicle proposed by the inventors is characterized in that the master control unit is configured to communicate outputting of an interrogation signal to the immobilizer control unit, by a signal, to all the drive control units other than itself, wherein it is preferably one of the drive control units, and wherein additionally there is preferably a transmission control unit to which the master control unit also communicates the outputting of an interrogation signal. The proposed method may be implemented by the proposed motor vehicle, with the result that the advantages described above with respect to the method also apply to the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE is a schematic diagram of the individual assemblies of a motor vehicle, for which assemblies the signal flow is explained below with reference to the arrows shown in the drawing.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The proposed method therefore begins with a vehicle driver activating a gas pedal P, as a result of which the driver communicates a "torque request", that is to say makes operator control input which is intended to ensure that the drives of the motor vehicle apply a torque in itself or apply a higher torque than before.

An electronic control unit (ECU) for an internal combustion engine of the motor vehicle receives this torque request.

The motor vehicle here will additionally have an electric machine for which there is a separate drive control unit ("PE" for "power electric"). In addition there is a third control unit which is provided for actuating a transmission ("TCU").

The engine control unit ECU acts on one or more actuators A1 which are associated with the internal combustion engine. The drive control unit PE acts on one or more actuators A2 which are associated with the electric machine. The transmission control unit TCU acts on one or more actuators A3 which are associated with the transmission.

The engine control unit ECU has at the same time the function of distributing a torque between the two drives in accordance with the torque request. Depending on the situation, it may be the case that the engine control unit causes the torque to be applied by the internal combustion engine, or it may be the case that the engine control unit causes the torque to be applied by the electric machine; finally, the torque can also be distributed between the two drives. This functionality as a master control unit is indicated in the drawing by the designation "hybrid".

The engine control unit ECU then checks, as a master control unit, whether the torque request can be implemented at all. It may in fact be the case that other conditions which have to be satisfied as well as the activation of the gas pedal P are not satisfied. In particular, there may be an immobilizer. The engine control unit ECU therefore transmits an interrogation to an immobilizer control unit, referred to in the drawing as "immobilizer master". At the same time as the outputting of the interrogation, the engine control unit ECU transmits to the other two control units ECU and TCU the communication that it has transmitted such an interrogation to the immobilizer master. This communication is conveyed by a specific bit. As a result, the control units PE and TCU are also made to transmit an interrogation to the immobilizer master, see steps 3a and 3b. After reception of such an interrogation, and in particular of all the interrogations, the immobilizer master checks whether a predetermined condition, in which driving of the motor vehicle is desired, is met. In particular, with respect to a key S it is checked whether a specific condition is met, for example whether the key S is inserted into a lock (not shown) and turned to what is referred to as the "terminal 15" position. In a "keyless-go system", the presence of a transponder with a specific identifier in the vicinity of a detection device can be checked for such a transponder etc. The immobilizer master then transmits an enable to the three control units ECU, PE and TCU, more or less simultaneously (steps 5a, 5b, 5c).

The engine control unit ECU then transmits in its functionality as the master control unit "hybrid" on the basis of the torque request requests to the other control units PE and TCU, step 6. In the next step (step 7) implementation takes place: the actuators A1, A2, A3 are actuated. If appropriate the implementation of merely some of the actuators by some of the control units takes place.

So that the first control unit can start the implementation according to step 7, the condition that the enable is present simultaneously for all three control units must be satisfied.

The outputting of the communication according to step 2b by the master control unit to the other two control units is intended to ensure that such an enable is provided sufficiently rapidly. The condition that an enable should be provided for all units is appropriate because during the later operation of the motor vehicle a changeover relating to commands and requests could otherwise not take place relatively quickly at short notice by the master control unit "hybrid" in predetermined situations.

There is to be provision here that the enable expires after some time. However, so that this does not occur with respect to the internal combustion engine when the motor vehicle is operated solely using the electric machine, the internal combustion engine is actuated at predetermined time intervals which are shorter than the time period after which the enable would expire.

According to the present drawing and the associated explanation, the engine control unit ECU is at the same time the master control unit "hybrid". However, this functionality could equally well also be integrated into the control unit PE, be integrated into the control unit TCU or even be made available by a separate fourth control unit (besides the immobilizer master).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a plurality of drive control units respectively assigned to a plurality of drives of a motor vehicle, the method comprising:
    receiving at a master control unit, presettings relating to a total torque which is to be applied jointly by the plurality of drives of the motor vehicle, the master control unit acting as a hybrid control unit;
    performing an interrogation process by outputting an interrogation from the master control unit to an immobilizer control unit;
    when the interrogation is output to the immobilizer control unit, sending a signal from the master control unit to at least one slave drive control unit to communicate performance of the interrogation process, so that the at least one slave drive control unit also transmits an interrogation to the immobilizer control unit;
    individually assigning, at the master control unit, partial drive torques respectively to the plurality of drives; and
    outputting at least one request signal from the master control unit only if the immobilizer control unit has returned an enable signal, each at least one request signal being used to communicate one of the partial torques to a corresponding slave drive control unit so that the at least one slave drive control unit outputs a control signal to communicate drive torque information to the corresponding drive only if the immobilizer control unit has returned an enable signal to the at least one slave drive control unit.

2. The method according to claim 1, wherein
    the master control unit operates as a drive control unit assigned to one of the drives of the motor vehicle.

3. The method according to claim 1, wherein
    the master control unit operates as a drive control unit assigned to an internal combustion engine, and the master control unit outputs a control signal to communicate drive torque information to the internal combustion engine only if the immobilizer control unit has returned an enable signal to the master control unit.

4. The method according to claim 1, wherein a transmission control unit is assigned to and outputs a control signal to, a transmission of the motor vehicle, and when the interrogation is output from the master control unit to the immobilizer control unit, the master control unit also communicates performance of the interrogation process to the transmission control unit, so that the transmission control unit also transmits an interrogation to the immobilizer control unit.

5. The method according to claim 1, wherein the at least one slave drive control unit comprises an electric motor drive control unit.

6. The method according to claim 5, wherein the master control unit operates as a drive control unit assigned to an internal combustion engine, and the master control unit outputs a control signal to communicate drive torque information to the internal combustion engine only if the immobilizer control unit has returned an enable signal to the master control unit.

7. The method according to claim 6, wherein a transmission control unit is assigned to and outputs a control signal to, a transmission of the motor vehicle, and when the interrogation is output from the master control unit to the immobilizer control unit, the master control unit also communicates performance of the interrogation process to the transmission control unit, so that the transmission control unit also transmits an interrogation to the immobilizer control unit.

8. A motor vehicle comprising:

an internal combustion engine;

a first drive control unit associated with the internal combustion engine, to transmit control signals to the internal combustion engine;

an electric drive;

a second drive control unit associated with the electric drive, to transmit control signals to the electric drive; and a master control unit to output an interrogation to an immobilizer control unit, to communicate the outputting of the interrogation to at least one of the first and second drive control units so that the at least one of the first and second drive control units transmits an interrogation to the immobilizer control unit, to assign torque requests to the internal combustion engine and the electric drive, and to communicate the torque requests to the at least one of the first and second drive control units, when the immobilizer control unit has returned a predetermined response signal to the interrogation, wherein the master control unit corresponds to a hybrid control unit.

9. The motor vehicle according to claim 8, wherein the master control unit is integrated with the first drive control unit.

10. The motor vehicle according to claim 9, wherein the motor vehicle further comprises:

a transmission; and a transmission control unit associated with the transmission, the master control unit is configured to send the transmission control unit transmission request signals and a signal which communicates the outputting of the interrogation.

11. The motor vehicle according to claim 8, wherein the motor vehicle further comprises:

a transmission; and a transmission control unit associated with the transmission, the master control unit is configured to send the transmission control unit transmission request signals and a signal which communicates the outputting of the interrogation.

12. The motor vehicle according to claim 8, further comprising:

a transmission; and a transmission control unit associated with the transmission, wherein the transmission control unit axis integrated with the master control unit, and communicates the outputting of the interrogation and the torque requests to the first and second drive control units.

13. The motor vehicle according to claim 8, wherein the master control unit is integrated with one of the first drive control unit, the second drive control unit, a transmission control unit, or an other control unit.

14. The motor vehicle according to claim 8, wherein all drive control units other than a drive control unit integrated with the master control unit, output an interrogation to the immobilizer control unit in response to receiving the communication from the master control unit of the outputting of the interrogation to the immobilizer control unit.

15. The motor vehicle according to claim 14, wherein the master control unit communicates the torque requests to all the drive control units other than a drive control unit integrated with the master control unit, only if the immobilizer control unit has returned a predetermined response signal to the interrogation of the master control unit and returned a predetermined response signal to the interrogation of all the drive control units other than a drive control unit integrated with the master control unit.

* * * * *

UNITED STATES PATENT AND TRADEMARK OFFICE
CERTIFICATE OF CORRECTION

| | | |
|---|---|---|
| PATENT NO. | : 8,589,010 B2 | Page 1 of 1 |
| APPLICATION NO. | : 13/641768 | |
| DATED | : November 19, 2013 | |
| INVENTOR(S) | : Johann Graf et al. | |

It is certified that error appears in the above-identified patent and that said Letters Patent is hereby corrected as shown below:

In the Claims

In Column 6, Line 27, In Claim 12, delete "axis" and insert -- is --, therefor.

Signed and Sealed this
Twenty-fifth Day of March, 2014

Michelle K. Lee
*Deputy Director of the United States Patent and Trademark Office*